United States Patent [19]

Mikami

[11] 4,287,326

[45] Sep. 1, 1981

[54] SILOXANE-MODIFIED EPOXY RESIN COMPOSITIONS

[75] Inventor: Ryuzo Mikami, Ichihara, Japan

[73] Assignee: Toray Silicone Company, Ltd., Tokyo, Japan

[21] Appl. No.: 126,231

[22] Filed: Mar. 3, 1980

[51] Int. Cl.³ .................... C08L 63/02; C08L 83/06
[52] U.S. Cl. ................... 525/476; 525/477; 525/523; 525/533; 528/27
[58] Field of Search ......................... 525/476

[56] References Cited

U.S. PATENT DOCUMENTS

| 3,055,858 | 9/1962 | Frye et al. | 528/15 |
|---|---|---|---|
| 3,088,847 | 5/1963 | Pines | 428/450 |
| 3,154,597 | 10/1964 | McWhorter | 525/523 |
| 3,170,962 | 2/1965 | Tyler | 525/524 |
| 3,247,280 | 4/1966 | Kanner | 525/523 |
| 3,358,064 | 12/1967 | Belko | 264/236 |
| 3,560,589 | 2/1971 | Sato et al. | 525/116 |
| 3,842,141 | 10/1974 | Fetscher et al. | 525/476 |
| 4,082,719 | 4/1978 | Liles et al. | 260/37 SB |
| 4,122,127 | 10/1978 | Mikami et al. | 525/477 |
| 4,141,926 | 2/1979 | Ariga et al. | 525/476 |

*Primary Examiner*—Wilbert J. Briggs, Sr.
*Attorney, Agent, or Firm*—James E. Bittell

[57] ABSTRACT

Compositions containing siloxane-modified epoxy resins, epoxy, methacryl, or amino organofunctional alkoxysilicon compound and conventional epoxy curing agents are described which have improved resistance to degradation of both electrical properties and adhesion when exposed to moisture or boiling water. The compositions consist essentially of (A) siloxane-modified epoxy resin, (B) an organofunctional alkoxysilicon compound such as γ-aminopropyltrimethoxysilane, γ-methacryloxypropyltrimethoxysilane, or γ-glycidoxypropyltrimethoxysilane, and (C) curing agents such as carboxylic acid anhydrides.

10 Claims, No Drawings

SILOXANE-MODIFIED EPOXY RESIN COMPOSITIONS

BACKGROUND OF THE INVENTION

This invention relates to siloxane-modified epoxy resin compositions which contain an epoxy, methacryl, or amino organofunctional alkoxysilicon compound and have improved resistance to degradation by moisture and boiling water.

As described in U.S. Pat. No. 3,154,597, siloxane-modified epoxy resins which have both the excellent chemical resistance of epoxy resins and the excellent heat resistance of siloxane resins are known. One drawback of the siloxane-modified epoxy resins is the poor resistance of the cured compositions to degradation by boiling water and moisture. For example, when siloxane-modified epoxy resins are cured using conventional curing agents for epoxy resins, especially polyhydric carboxylic acids or their anhydrides, the electrical resistance and adhesion to inorganic substrates decreases significantly when the composition is treated with boiling water.

One of the purposes of the present invention then is to improve the resistance to degradation by water of electrical properties and adhesion of cured siloxane-modified epoxy resin compositions.

A companion application Ser. No. 126,238, by the same inventor with the same filing date and assigned to the same assignee describes siloxane-modified epoxy resin compositions with improved resistance to degradation by boiling water and moisture. In addition to the siloxane-modified epoxy resin and curing agent, the compositions contain an organopolysiloxane which has at least one alkoxy radical bound to silicon.

SUMMARY OF THE INVENTION

It has been found that the addition of an epoxy, methacryl or amino organofunctional alkoxysilicon compound to compositions containing siloxane-modified epoxy resins and curing agent improves the resistance to moisture degradation in the cured compositions. This invention relates to a siloxane-modified epoxy resin composition consisting essentially of (A) 100 parts by weight of a siloxane-modified epoxy resin prepared by reacting (1) 5 to 70 parts by weight of an alkylphenylpolysiloxane of the general unit formula $$R_a SiX_b O_{(4-a-b/2)}$$

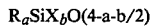

wherein R is selected from the group consisting of alkyl radicals and phenyl radicals such that the ratio of alkyl radicals to phenyl radicals in the alkylphenylpolysiloxane is 0.3 to 3.0, X is an alkoxy radical or a hydroxyl radical, a is 0.9 to 1.8 and b is 0.01 to 2 with (2) 95 to 30 parts by weight of an epoxy resin having at least two epoxy groups per molecule, (B) 0.01 to 100 parts by weight of an organosilicon compound having attached to silicon an alkoxy radical and a monovalent organic radical containing a functional group selected from the group consisting of an epoxy group, a methacryl group and an amino group and (C) a curing agent for (A).

DETAILED DESCRIPTION OF THE INVENTION

The siloxane-modified epoxy resin (A) employed in this invention is prepared by reacting (1) an alkylphenylpolysiloxane with (2) an epoxy resin.

The alkylphenylpolysiloxanes employed in the preparation of resin (A) must have functional groups which are capable of reacting with the functional groups of the epoxy resin. Suitable alkylphenylpolysiloxanes then must have hydroxyl radicals or alkoxy radicals which are bound to silicon atoms. The preferred alkylphenylpolysiloxanes have 0.01 to 2 of these functional groups per silicon atom in the siloxane.

The organic radicals bound to the silicon atoms of the alkylphenylpolysiloxanes are alkyl radicals and phenyl radicals. Suitable alkyl radicals include the methyl, ethyl, propyl, butyl and octadecyl radicals. It is important that the ratio of alkyl radicals to phenyl radicals in the polysiloxane be in the range of 0.3 to 3.0. If the molar ratio of alkyl radicals to phenyl radicals in the polysiloxane is too low, the siloxane-modified epoxy resin prepared from that polysiloxane is undesirably brittle. On the other hand, if the ratio is too high, it is difficult to carry out the modification reaction with the epoxy resin.

In addition, the average number of organic radicals per silicon atom for the polysiloxane should be in the range of 0.9 to 1.8. Siloxane-modified epoxy resin prepared from a polysiloxane containing less than 0.9 organic radicals per silicon atom is too brittle while resin prepared from a polysiloxane containing greater than 1.8 organic radicals per silicon atom is too soft.

Suitable alkylphenylpolysiloxanes can be produced by conventional methods. For example, the alkylphenylpolysiloxanes can be produced by the co-hydrolysis and co-condensation of the corresponding halo or alkoxy silanes.

The epoxy resins which are reacted with the alkylphenylpolysiloxanes are common epoxy resins having at least two epoxy groups per molecule. Examples of these epoxy resins are as follows: polyglycidyl esters, polyglycidyl ethers which are obtained by base catalyzed reaction of epichlorohydrin with aromatic polyhydric phenols such as bisphenol A, bisphenol F, halogenated bisphenol A, catechol, resorcinol, methylresorcinol and novalak resins or aliphatic polyhydric alcohols such as glycerol, ethylene glycol and neopentyl glycol and epoxidized polyolefins such as epoxidized polybutadienes and epoxidized soybean oil. The preferred epoxy resins for the present invention are the polydiglycidyl ethers of bisphenol A with a molecular weight of 340 to 6000. Such epoxy resins are commercially available as Epon TM 828, Epon TM 1001 and Epon TM 1004 from the Shell Chemical Company.

The siloxane-modified epoxy resins can be produced by reacting the above-described alkylphenylpolysiloxanes with the epoxy resins according to the methods specified in U.S. Pat. No. 3,154,597 which is hereby incorporated by reference, Japanese Pat. No. Sho 29[1954]-8695, and Japanese Pat. No. Sho 29[1954]-8697. For example, the alkylphenylpolysiloxane can be reacted with the epoxy resin by heating the combined materials at about 120° to 210° C. If desirable, a solvent such as toluene, xylene, acetic acid esters and various ketones can be employed to reduce the viscosity of the reaction composition. In addition, catalysts such as alkyl titanates, p-toluenesulfonic acid and organic carboxylic acids can be employed to facilitate the reaction.

Generally, 5 to 70 parts by weight of the alkylphenylpolysiloxane can be reacted with 95 to 5 parts by weight of the epoxy resin to prepare siloxane-modified epoxy resins useful in the present invention. If a lower amount of alkylphenylpolysiloxane is employed, the heat resistance of the resulting resin is not significantly improved, while if higher amounts are employed, the mechanical strength of the cured composition is reduced. Preferably, 15 to 50 parts by weight of the alkylphenylpolysiloxane is reacted with 85 to 50 parts by weight of the epoxy resin.

The organosilicon compound (B) employed in the compositions of this invention is an important constituent which imparts moisture and boiling water resistance to the cured siloxane-modified epoxy resin. Cured compositions of this invention retain their electrical properties and adhesion to inorganic substrates even after exposure to boiling water for extended periods. Suitable organosilicon compounds (B) have at least one alkoxy radical attached to silicon and at least one monovalent functional organic radical attached to silicon. The organosilicon compounds include organofunctional silanes of the general formula $$Z_m-\underset{R'_{4-m-n}}{Si}-Y_n$$

wherein Z is a monovalent organic radical containing a functional group selected from the group consisting of an epoxy group, a methacryl group and an amine group, Y is a lower alkoxy radical, R' is a hydrogen atom or a monovalent hydrocarbon radical, m and n are integers of 1 to 3 and m+n does not exceed 4.

Representative of Z are organic radicals in which an epoxy group, methacryl group or amino group is bound to a divalent organic radical such as methylene, ethylene, propylene, phenylene, hydroxylated hydrocarbon radicals, chloroethylene, fluoroethylene and —CH$_2$OCH$_2$CH$_2$CH$_2$—, —CH$_2$CH$_2$OCH$_2$CH$_2$—,
—CH$_2$CH$_2$OCHCH$_2$—, and —CH$_2$OCH$_2$CH$_2$OCH$_2$CH$_2$—
         |
         CH$_3$ Examples of lower alkoxy radicals include methoxy, ethoxy, propoxy, isopropoxy and butoxy.

Examples of suitable monovalent hydrocarbon radicals include methyl, ethyl, propyl, octyl, cyclohexyl, phenyl and vinyl.

It should be understood that suitable organosilicon compounds (B) also include both partially hydrolyzed products of the above organofunctional silanes and straight chain or cyclic copolymers of the above organofunctional silanes with other nonfunctional organosilanes.

Examples of suitable organosilicon compounds (B) include

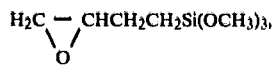

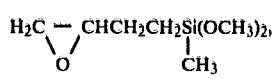

-continued

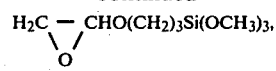

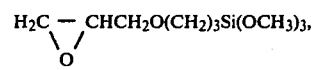

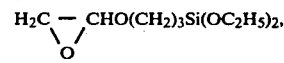

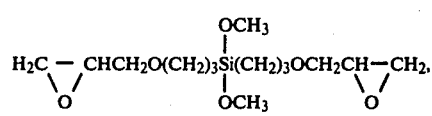

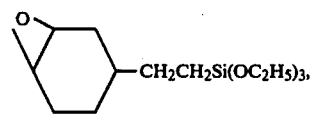

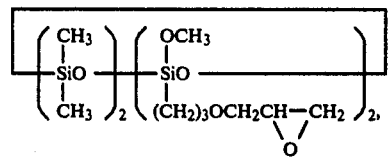

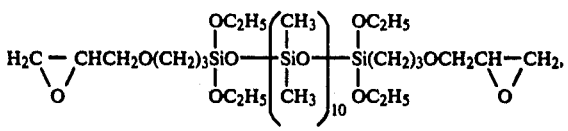

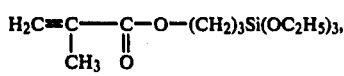

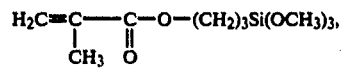

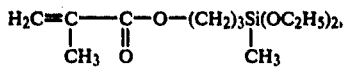

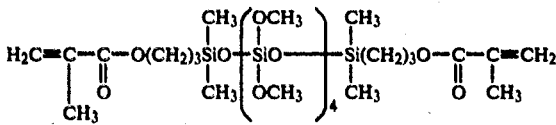

H$_2$N—(CH$_2$)$_3$Si(OC$_2$H$_5$)$_3$,

H$_2$NCH$_2$CH$_2$NH(CH$_2$)$_3$Si(OCH$_3$)$_3$,

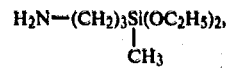

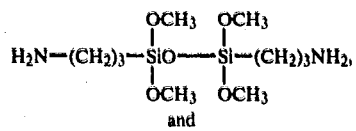

and

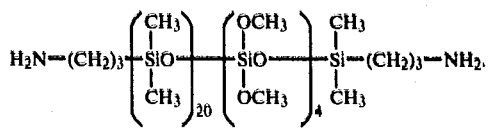

These compounds can be used alone or two or more compounds can be used in combination.

Generally, the amount of (B) employed is in the range of 0.01 to 100 parts by weight (B) to 100 parts by weight of the siloxane-modified epoxy resin (A). If the amount of (B) used is too low, satisfactory adhesion with resistance to boiling water is not obtained. If it is too high, the cured composition becomes brittle. Preferably, the amount of (B) employed is in the range of 0.5 to 50 parts by weight per 100 parts by weight (A).

Curing agent (C) is employed in the compositions of this invention to cure the siloxane-modified epoxy resin. Curing agents which are commonly used for epoxy resins can be used without any modifications. Conventional curing agents for epoxy resins include organic compounds having amino groups, carboxyl groups, carboxylic anhydride groups, hydroxyl groups, -SH groups, -NCO groups, -NCS groups or CONH- groups, organometallic compounds, Lewis acids, organic mineral acid esters, or titanium, zinc, boron or aluminum compounds containing organic groups. In addition, other acidic or basic compounds are also applicable.

Examples of these compounds are as follows: aliphatic polyamines such as ethylenediamine, diethylenetriamine, triethylenetetramine, dipropylenetriamine, dimethylaminopropylamine, diethylaminopropylamine and cyclohexylaminopropylamine, aliphatic hydroxyl-monoamines such as monoethanolamine, diethanolamine, propanolamine and N-methylethanolamine, aliphatic hydroxyl-polyamines such as aminoethylethanolamine, monohydroxyethyldiethylenetriamine, bishydroxyethyldiethylenetriamine, and N-(2-hydroxypropyl)ethylenediamine, aromatic amines such as aniline, toluidine, ethylaniline, xylidine, benzidine, 4,4'-diaminodiphenylmethane, 2,4,6-tri(dimethylaminomethyl)phenol, 2,2-bis(4-aminophenyl)propane, 4,4'-diaminodiphenyl ether, 4,4'-diaminodiphenyl sulfone, 4,4'-diaminobenzophenone, 2,2'-dimethyl-4,4'-diaminodiphenylmethane, 2,4'-diaminobiphenyl, 3,3'-dimethyl-4,4'-diaminobiphenyl and 3,3'-dimethoxy-4,4'-diaminobiphenyl, aliphatic amines having a cyclic structure such as piperidine, N-aminoethylpiperidine and triethylenediamine, polyhydric carboxylic acids such as phthalic acid, maleic acid, trimellitic acid, pyromellitic acid, tetrahydrophthalic acid, hexahydrophthalic acid, tetrachlorophthalic acid, dodecenylsuccinic acid, endomethylenephthalic acid, methylendomethylenephthalic acid, hexachloromethylene tetrahydrophthalic acid and chloromaleic acid and their acid anhydrides. Other examples of nitrogen-containing curing agents are dicyandiamide, guanidine, NCO-group-containing polyurethane resin prepolymer, and urea resin primary condensation product. In addition, titanium, zinc, boron and aluminum compounds containing organic groups, i.e. tetrabutyl titanate, dibutyltin dilaurate, Cu[Al(C$_4$H$_9$O)$_4$]$_2$, stannous octoate, zinc octoate, cobalt naphtholate, may also be applicable. In particular, polyhydric carboxylic acids or their acid anhydrides are preferred.

The amount of curing agent (C) employed in the compositions of the present invention varies significantly depending upon the type of curing agent selected. Generally, the amount of curing agent to be employed, can be calculated roughly as one equivalent curing agent based on the groups subject to reaction in the curing agent per equivalent siloxane-modified epoxy resin based on the groups subject to reaction in the resin. However, the optimal amount of curing agent may fluctuate considerably from this calculated equivalent value. Therefore, the optimum amount of curing agent for any particular composition is best determined by a few initial experiments.

In addition to the essential constituents (A), (B) and (C), various additives can be included in the compositions of this invention. For example, additives such as inorganic pigments, organic pigments, antimony oxide, silica, silica powder, glass fiber, clay, mica, aluminum powder can be included in the compositions. When the siloxane-modified epoxy resins are produced, an organic solvent can be used as mentioned previously. The siloxane-modified epoxy resins still containing the above-mentioned organic solvent can be used in the composition of this invention, or a fresh organic solvent can be added.

The following examples are presented for illustrative purposes and should not be construed as limiting the invention set forth in the claims. Unless otherwise specified, "parts" and "percent" as used in the following examples imply "parts by weight" and "percent by weight", respectively.

EXAMPLE 1

A polydiglycidyl ether of bisphenol A epoxy resin with an epoxy equivalent weight of 450-550, Epon TM 1001 from Shell Chemical Co. (112.5 parts), methylphenylpolysiloxane with a molecular weight of approximately 1600 and an average composition of $(CH_3)_{0.35}(C_6H_5)_{0.70}(OH)_{0.28}SiO_{1.335}$ (37.5 parts), 2-ethylhexanoic acid (2 parts) and ethylene glycol monoethyl ether acetate (100 parts) were placed in a 500 ml four-necked flask which was equipped with a distilling tube, a condenser, a stirring device and a thermometer. The mixture was slowly heated to 150°–155° C. Water produced as a by-product was distilled from the reaction system during the reaction. Samples of the reaction mixture were occasionally removed and placed on a glass plate. The reaction was continued until a transparent film was obtained on the glass plate after evaporating the solvent. The reaction time required was 8 hours. After a transparent film was obtained, the temperature was decreased to 120° C. and additional ethylene glycol monoethyl ether acetate (50 parts) was added. As a result, a siloxane-modified epoxy resin with a solids content of about 50 percent was obtained.

Five different compositions were prepared as shown in Table I by mixing the above siloxane-modified epoxy resin (100 parts, solids content), trimellitic anhydride as a curing agent (12 parts) and three different organosilicon compounds in various amounts.

The resulting compositions were coated at a thickness of approximately 50 μm on a degreased glass plate with the dimensions 50×50×5 mm. The coating was baked at 150° C. for 60 minutes. The physical properties of the coatings were determined before and after treating the coated plates with boiling water for 30 hours under standard pressure.

For the determination of volume resistivity, the compositions were coated at a thickness of approximately 100 μm on aluminum test panels with the dimensions 100×100×0.3 mm. The coating was baked at 150° C. for 60 minutes. The results of the checkerboard adhesion test and volume resistivity measurement are presented in Table I. The volume resistivity measurement was conducted according to JIS-C-2122. The checkerboard adhesion test consisted of cutting a grid of lines in the coating to produce 100 squares (1 mm²) in an area of 10 mm×10 mm of the plate. Cellophane tape was applied to the squares with pressure and then peeled off. The degree of adhesion was expressed as the number of squares which remained on the base plate out of the original 100 squares.

The results shown in Table I indicate that comparison compositions without the organosilicon compound peeled away spontaneously from the glass plate within one hour of boiling in water. On the other hand, coatings prepared from compositions with organosilicon compounds according to this invention were found to be firmly adhered to the glass plate even after boiling in water for 30 hours. Thus, the adhesion was found to be resistant to boiling water.

Similarly, boiling water significantly reduced the volume resistivity of coatings prepared from comparison compositions without an organosilicon compound, while much less effect was observed with coatings prepared from compositions containing the organosilicon compounds according to this invention.

hexanoic acid (2 parts) and ethylene glycol monoethyl ether acetate (100 parts) were placed in a 500 ml four-necked flask which was equipped with a distilling tube, a condenser, a stirring device and a thermometer. The mixture was slowly heated to 150°–155° C. Samples of the reaction mixture were occasionally taken and put on a glass plate during the reaction. The reaction was continued until a transparent film was obtained on the glass plate after evaporating the solvent. After 9 hours, the temperature was decreased to 120° C. and additional ethylene glycol monoethyl ether acetate (50 parts) was added. As a result, a siloxane-modified epoxy resin with a solids content of about 50 percent was obtained.

Three different types of compositions were prepared by adding zero, 5 or 10 parts of 1,3-bis(3-aminopropyl)-1,1,3,3-tetramethoxydisiloxane to a mixture of the above siloxane-modified epoxy resin (100 parts based on solids), hexahydrophthalic anhydride (24 parts) as a curing agent and tin octoate (0.46 parts) as a reaction accelerator.

TABLE I

| | | Example | | | | Comparative Example |
|---|---|---|---|---|---|---|
| Components | Siloxane-modified epoxy resin (solids content) (parts) | 100 | 100 | 100 | 100 | 100 |
| | Trimellitic anhydride (parts) | 12 | 12 | 12 | 12 | 12 |
| | N-(2-aminoethyl)-3-aminopropyl-trimethoxysilane (parts) | 6 | — | — | 3 | — |
| | γ-glycidoxypropyltrimethoxy-silane (parts) | — | 6 | — | 3 | — |
| | γ-methacryloxypropyltrimethoxy-silane (parts) | — | — | 6 | — | — |
| Physical properties of coating | Appearance of coated film | transparent | transparent | transparent | transparent | transparent |
| | Pencil hardness | 2 H | 2 H | 2 H | 2 H | 2 H |
| | Adhesion (checkerboard test) | 100/100 | 100/100 | 100/100 | 100/100 | 100/100 |
| | Treatment with boiling water (glass plate) | | | | | |
| | 1 hour | good | good | good | good | spontaneous peeling |
| | 10 hours | " | " | " | " | spontaneous peeling |
| | 30 hours | " | " | " | " | spontaneous peeling |
| | Volume resistivity (Ω . cm) in the initial cured state (before treatment) | $5.8 \times 10^{16}$ | $4.9 \times 10^{16}$ | $5.1 \times 10^{16}$ | $7.0 \times 10^{16}$ | $6.3 \times 10^{16}$ |
| | Treatment with boiling water | $1.1 \times 10^{15}$ | $1.1 \times 10^{15}$ | $1.0 \times 10^{15}$ | $1.3 \times 10^{15}$ | $1.7 \times 10^{13}$ |

EXAMPLE 2

The epoxy resin employed in Example 1, (105 parts), methylphenylpolysiloxane with a molecular weight of approximately 2300 and an average composition of $(CH_3)_{0.83}(C_6H_5)_{0.41}(OH)_{0.25}SiO_{1.255}$ (45 parts), 2-ethyl- The compositions were coated on glass plates and aluminum plates and cured by the same method as in Example 1. The same tests as in Example 1 were conducted with respect to the cured films. The results obtained are presented in Table II.

TABLE II

| | | Example | | Comparison Example |
|---|---|---|---|---|
| Components | Siloxane-modified epoxy resin (solids content) (parts) | 100 | 100 | 100 |
| | Hexahydrophthalic anhydride (parts) | 24 | 24 | 24 |
| | Tin octoate (parts) | 0.46 | 0.46 | 0.46 |
| | 1,3-bis(3-aminopropyl)-1,1,3,3-tetramethoxydisiloxane | 5 | 10 | 0 |
| Physical properties of coating | Appearance of coated film | Transparent | Transparent | Transparent |
| | Pencil hardness | 2 H | 2 H | 2 H |
| | Adhesion (checkerboard test) | 100/100 | 100/100 | 100/100 |
| | Treatment with boiling water (glass plate) | | | |
| | 1 hour | good | good | spontaneous peeling |
| | 10 hours | " | " | spontaneous peeling |

TABLE II-continued

| | Example | | Comparison Example |
|---|---|---|---|
| 30 hours | " | " | spontaneous peeling |
| Volume resistivity (Ω . cm) in initial cured state (before water treatment) | $7.0 \times 10^{16}$ | $7.6 \times 10^{16}$ | $6.9 \times 10^{16}$ |
| After treatment with boiling water for 2 hours | $1.3 \times 10^{15}$ | $1.3 \times 10^{15}$ | $1.6 \times 10^{13}$ |

That which is claimed is:

1. A siloxane-modified epoxy resin composition consisting essentially of (A) 100 parts by weight of a siloxane-modified epoxy resin prepared by reacting (1) 5 to 70 parts by weight of an alkylphenylpolysiloxane of the general unit formula $$R_a SiX_b O_{(4-a-b/2)}$$

wherein each R is an alkyl or phenyl radical such that the ratio of alkyl radicals to phenyl radicals in the alkylphenylpolysiloxane is 0.3 to 3.0, X is an alkoxy radical or a hydroxyl radical, a is 0.9 to 1.8, and b is 0.01 to 2 with (2) 95 to 30 parts by weight of an epoxy resin having at least two epoxy groups per molecule, (B) 0.01 to 100 parts by weight of an organosilicon compound having attached to silicon an alkoxy radical and a monovalent organic radical containing a functional group selected from the group consisting of an epoxy group, a methacryl group and an amino group and (C) a curing agent for (A).

2. A siloxane-modified epoxy resin composition according to claim 1 in which siloxane epoxy resin (A) is prepared by reacting 15 to 50 parts by weight (1) with 85 to 50 parts by weight (2) at 120° to 210° C.

3. A siloxane-modified epoxy resin composition according to claim 2 in which the epoxy resin (2) is a polydiglycidyl ether of bisphenol A resin.

4. A siloxane-modified epoxy resin composition according to claim 3 in which the epoxy resin has a molecular weight of 340 to 6000.

5. A siloxane-modified epoxy resin composition according to claim 4 containing 0.5 to 50 parts by weight of organosilicon compound (B).

6. A siloxane-modified epoxy resin composition according to claim 5 in which the organosilicon compound (B) has the general formula $$Z_m - \underset{\underset{R_{4'-m-n}}{|}}{Si} - Y_n$$

wherein Z is a monovalent organic radical containing a functional group selected from the group consisting of an epoxy group, a methacryl group and an amino group, Y is a lower alkoxy radical, R' is a hydrogen atom or a monovalent hydrocarbon radical, m and n are integers from 1 to 3 and m+n does not exceed 4.

7. A siloxane-modified epoxy resin composition according to claim 5 in which the organosilicon compound (B) is an organopolysiloxane with a degree of polymerization of 2 to 30.

8. A siloxane-modified epoxy resin composition according to claim 5 containing a curing agent (C) selected from the group consisting of polyhydric carboxylic acids and polyhydric carboxylic acid anhydrides.

9. A siloxane-modified epoxy resin composition according to claim 8 in which the curing agent (C) is trimellitic anhydride.

10. A siloxane-modified epoxy resin composition according to claim 8 in which the curing agent (C) is hexahydrophthalic anhydride.

* * * * *

UNITED STATES PATENT AND TRADEMARK OFFICE
CERTIFICATE OF CORRECTION

PATENT NO. : 4,287,326
DATED : September 1, 1981
INVENTOR(S) : Ryuzo Mikami

It is certified that error appears in the above-identified patent and that said Letters Patent are hereby corrected as shown below:

In Column 3, line 27; the formula reading "$Z_m-\underset{\underset{R_{4'-m-n}}{|}}{Si}-Y_n$"

should read "$Z_m-\underset{\underset{R'_{4-m-n}}{|}}{Si}-Y_n$"

In Column 10, line 20; the formula reading "$Z_m-\underset{\underset{R_{4'-m-n}}{|}}{Si}-Y_n$"

should read "$Z_m-\underset{\underset{R'_{4-m-n}}{|}}{Si}-Y_n$"

Signed and Sealed this

Twenty-sixth Day of January 1982

[SEAL]

Attest:

Attesting Officer

GERALD J. MOSSINGHOFF

Commissioner of Patents and Trademarks